(12) United States Patent
Materne et al.

(10) Patent No.: US 6,506,829 B1
(45) Date of Patent: Jan. 14, 2003

(54) RUBBER COMPOSITION CONTAINING TWO SILICAS

(75) Inventors: Thierry Florent Edme Materne, Viville (BE); Giorgio Agostini, Colmar-Berg (LU); Friedrich Visel, Bofferdange (LU); Uwe Ernst Frank, Marpingen (DE); René Jean Zimmer, Howald (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/625,109

(22) Filed: Jul. 25, 2000

Related U.S. Application Data

(60) Provisional application No. 60/149,643, filed on Aug. 25, 1999.

(51) Int. Cl.[7] .............................. C08K 3/36; C08K 3/34
(52) U.S. Cl. ..................... 524/493; 524/262; 524/492
(58) Field of Search ................................. 524/493, 492, 524/262

(56) References Cited

U.S. PATENT DOCUMENTS

| | | | | |
|---|---|---|---|---|
| 3,867,326 A | * | 2/1975 | Rivin et al. | |
| 4,184,998 A | * | 1/1980 | Shippy et al. | |
| 4,590,052 A | * | 5/1986 | Chevallier et al. | 423/335 |
| 5,036,134 A | * | 7/1991 | Kunz et al. | 524/560 |
| 5,227,425 A | | 7/1993 | Rauline | 524/493 |
| 5,753,732 A | * | 5/1998 | Wideman et al. | 524/263 |
| 5,846,506 A | * | 12/1998 | Esch et al. | 423/338 |
| 5,925,708 A | * | 7/1999 | Esch et al. | 524/493 |
| 5,973,057 A | * | 10/1999 | Scholey | 524/492 |
| 6,225,397 B1 | * | 5/2001 | Materne et al. | 524/493 |

OTHER PUBLICATIONS

KR 9302267B. Abstract, HAN, Mar. 27, 1993.*

* cited by examiner

*Primary Examiner*—Margaret Medley
(74) *Attorney, Agent, or Firm*—Bruce J. Hendricks; John D. Delong

(57) ABSTRACT

The present invention relates to a rubber composition comprising (A) an elastomer containing olefinic unsaturation and (B) 35 to 110 phr of silica filler, wherein said silica filler is comprised of (i) 10 to 100 phr of a first silica having a pore size distribution maximum of the aggregates in the first silica ranging from greater than 55 to 400 nm as determined by mercury porosimetry and an average specific surface area ranging from 60 to 135 $m^2/g$ as determined by $N_2$ adsorption; and (ii) 10 to 100 phr of a second silica having a pore size distribution maximum of the aggregates in the second silica ranging from 5 to 50 nm as determined by mercury porosimetry and an average specific surface area ranging from 140 to 250 $m^2/g$ as determined by $N_2$ adsorption.

19 Claims, No Drawings

RUBBER COMPOSITION CONTAINING TWO SILICAS

This application claims the benefit of U.S. Provisional Application No. 60/149,643 filed Aug. 25, 1999.

FIELD OF THE INVENTION

The present invention relates to a silica-filled rubber compositions and their use in tires.

BACKGROUND OF THE INVENTION

Recently, there has been a lot of interest in the use of silica reinforcement of rubber for use in tire treads. Use of high reinforcing grades of silica are known to improve the treadwear of the tread rubber. Use of less reinforcing grades of silica are known to improve wet traction and rolling resistance.

SUMMARY OF THE INVENTION

The present invention relates to a rubber composition containing a blend of two different silicas.

DETAILED DESCRIPTION OF THE INVENTION

There is disclosed a rubber composition comprising (A) an elastomer containing olefinic unsaturation and (B) 35 to 110 phr of silica filler, wherein said silica filler is comprised of (i) 10 to 100 phr of a first silica having a pore size distribution maximum of the aggregates in the first silica ranging from greater than 55 to 400 nm as determined by mercury porosimetry and an average specific surface area ranging from 60 to 135 $m^2/g$ as determined by $N_2$ adsorption; and (ii) 10 to 100 phr of a second silica having a pore size distribution maximum ranging from 5 to 50 nm as determined by mercury porosimetry and an average specific surface area ranging from 140 to 250 $m^2/g$ as determined by $N_2$ adsorption.

In addition, there is disclosed a method of processing a rubber composition which comprises mixing (i) 100 parts by weight of at least one sulfur vulcanizable elastomer containing olefinic unsaturation; and (ii) 35 to 110 phr of total silica filler, the improvement comprising (a) initially dispersing in said elastomer from 10 to 100 phr of a high reinforcing grade silica characterized by a pore size distribution maximum ranging from 5 to 50 nm as determined by mercury porosimetry and an average specific surface area ranging from 140 to 250 $m^2/g$ as determined by $N_2$ adsorption; and thereafter (b) dispersing in said elastomer from 10 to 100 phr of a low reinforcing grade silica characterized by a pore size distribution maximum ranging from greater than 55 to 400 nm as determined by mercury porosimetry and an average specific surface area ranging from 60 to 135 $m^2/g$ as determined by $N_2$ adsorption.

The present invention relates to sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/ dicyclopentadiene terpolymers. The preferred rubber or elastomers are polybutadiene and SBR.

In yet another aspect of the present invention, it is preferred to use a rubber or elastomer containing olefinic unsaturation and an additional functional group reactive with the sulfur containing organosilicon compounds of Formula I described later. Representative functional groups include halogens, such as Cl and Br; alkoxy groups, such as methoxy groups; and pseudohalogens, such as —SCN.

In yet another aspect of the invention, the elastomer containing olefinic unsaturation may be a siloxy-terminated polymer, such as siloxy-terminated styrene-butadiene copolymer, siloxy-terminated isoprene-butadiene copolymer and siloxy-terminated styrene-isoprene-butadiene terpolymer.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

According to this invention, it is believed to be a very substantial departure from past practice, for tires, to utilize two highly dispersible silicas, in a manner described herein. In this invention, the silica reinforcement requires two silicas which are each characterized by their different pore size distribution maximum and average specific surface areas.

The pore size distribution maximum (PSD) of the aggregates of each silica is determined by mercury porosimetry. For such techniques, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, page 39 (1959), or according to DIN 66133. For such an evaluation, a CARLO-ERBA Porosimeter 2000 might be used.

The average specific surface area (BET SSA) is to be determined by $N_2$ adsorption. For such technique, see Brunnauer, Emmet, Teller, JACS, Vol 60, page 309 (1938).

The first silica used in the present invention is known as a "low" reinforcing grade. Throughout this application, the term "first silica" and "low reinforcing grade silica" are used interchangeably. This silica is characterized by a pore size distribution maximum of the aggregates ranging from greater than 55 to 400 nm as determined by mercury porosimetry. Preferably, the pore size distribution maximum of the aggregates ranges from 60 to 120 nm. The average specific surface area of the first silica ranges from 60 to 135 $m^2/g$. Preferably, the average specific surface area ranges from 70 to 125 $m^2/g$.

Representative examples of commercially available silica which conform to the above requirements as the first silica include silicas sold by Rhodia under the designations Z1115MP (125 $m^2/g$ BET SSA and 60 nm PSD), RP85 (65 $m^2/g$ BET SSA and 150 nm PSD) and Z85MP (65 $m^2/G$ BET SSA and 60 nm PSD). Additional silicas are commercially available from Degussa under the designation Aerosil™ OX50 (65 $m^2/g$ BET SSA and 90 nm PSD) and from PPG under the designation Hi-Sil™ 532 (60 $m^2/g$ and 80 nm PSD).

The second silica used in the present invention is known as a "high" reinforcing grade. Throughout this application, the terms "second silica" and "high reinforcing grade silica" are used interchangeably. This silica is characterized by a pore size distribution maximum of the aggregates in the second silica ranging from 5 to 50 nm. Preferably, the pore size distribution maximum of the aggregates ranges from 10 to 40 nm. The average specific surface area of the second silica ranges from 140 to 250 $m^2/g$ as determined by $N_2$ adsorption. Preferably, the average specific surface area ranges from 140 to 300 $m^2/g$.

Representative examples of commercially available silica which conform to the above requirements as the second silica include silicas sold by Rhodia under the designations Z1165MP (175 $m^2/g$ BET SSA and 35 nm PSD), RP240HD (260 $m^2/g$ BEG SSA and 15 nm PSD) and RP200MP (220 $m^2/g$ BET SSA and 20 nm PSD). Additional silicas are commercially available from Degussa under the designations Ultrasil™ 7000 GR (190 $m^2/g$ BET SSA and 35 nm PSD) and VN3 190 $m^2/g$ BET SSA and 30 nm PSD) and from Huber under the designations Zeopol™ 8745 (180 $m^2/g$ BET SSA and 35 nm PSD) and Zeopol™ 8755 (190 $m^2/g$ BET SSA and 35 nm PSD).

In accordance with a preferred embodiment, the pore size distribution maximum of the first silica differs from that of the pore size distribution maximum of the aggregates of the second silica by at least 5 nm. Preferably, the pore size distribution maximum of the first silica differs from that of the second silica by at least 30 nm.

In accordance with a preferred embodiment, the average specific surface area of the first silica differs from that of the second silica by at least 5 $m^2/g$. Preferably, the average specific surface area of the first silica differs from that of the second silica by at least 60 $m^2/g$ The rubber composition of the present invention contains a total (combined weights of the first and second silica) weight of silica ranging from 35 to 110 phr. Preferably, the total amount of silica ranges from about 50 to 95 phr. The first silica is generally present in an amount ranging from 10 to 100 phr, with a balance of 10 to 100 phr being the second silica. Preferably, the first silica is present in an amount ranging from 10 to 85 phr, with a balance of 10 to 40 phr being derived from the second silica.

The weight ratio of the first silica to the second silica may vary. Generally, the ratio will range from 10:1 to 1:10. Preferably, the ratio will range from 1:8.5 to 1:4.

In addition to silica, the rubber composition may contain other fillers. Representative fillers include carbon black, aluminosilicates, clays, zeolites, modified starches, carbon black/silica composites and the like. Such fillers may be present in an amount ranging from 10 to 150 phr. If carbon black is used, the amount of carbon black may vary. Generally speaking, the amount of carbon black will vary from 0 to 80 phr. Preferably, the amount of carbon black will range from 0 to 40 phr. It is to be appreciated that a silica coupler may be used (described later) in conjunction with a carbon black, namely pre-mixed with a carbon black prior to addition to the rubber composition, and such carbon black is to be included in the aforesaid amount of carbon black for the rubber composition formulation.

Where the rubber composition contains both silica and carbon black, the weight ratio of silica to carbon black may vary. For example, the weight ratio may be as low as 11:8 to a silica to carbon black weight ratio of 110:1. Preferably, the weight ratio of silica to carbon black ranges from 110:1 to 11:4. The combined weight of the silica and carbon black, as herein referenced, may be as low as about 35 phr, but is preferably from about 36 to about 190 phr.

The rubber composition containing the two silicas is preferably used with a silica coupling agent. Example of a suitable coupling agents include sulfur containing organosilicon compounds. Examples of suitable sulfur containing organosilicon compounds are of the formula:

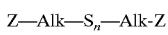  I in which Z is selected from the group consisting of

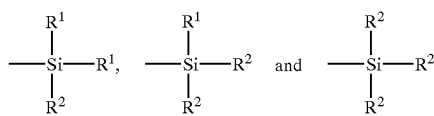

where $R^1$ is an alkyl group of 1 to 4 carbon atoms, cyclohexyl or phenyl;
$R^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis (triethoxysilylpropyl) tetrasulfide and 3,3'-bis (triethoxysilylpropyl) disulfide. Preferably Z is

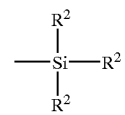

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 4.

The amount of the above sulfur containing organosilicon compound in a rubber composition will vary depending on the level of silica that is used. Generally speaking, the amount of the compound of Formula I will range from 0 to 1.0 parts by weight per part by weight of the silica. Preferably, the amount will range from 0 to 0.4 parts by weight per part by weight of the silica.

It is readily understood by those having skill in the art that the rubber composition may contain conventional additives generally known in the rubber compounding art, such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. In accordance with a preferred embodiment, the high reinforcing grade silica is initially mixed with the rubber, for example, in a first non-productive followed by the addition of the low reinforcing grade silica such as being mixed with the product of the first nonproductive in a second non-productive mixing stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, two silicas, silica coupler and carbon black, if used, are mixed in one or more non-productive mix stages. The terms "non-productive" and "productive" mix stages are well known to those having skill in the rubber mixing art. The rubber composition containing the rubber and two silicas should, as well as the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

EXAMPLE

Three rubber compositions were prepared and comprised of the ingredients listed in Table I. The rubber compositions were prepared by mixing the ingredients in one non-productive stage (without curatives) and a productive stage. The resulting compositions were cured under the same conditions of elevated temperature and pressure. Sample A (Control) contained 83 phr of a high reinforcing silica that is commercially available from Rhodia under the designation Z1165MP. Sample B (Control) contained 83 phr of a low reinforcing silica that is commercially available from Rhodia under the designation Z1115MP. Sample C (present invention) contained 41.5 phr of Z1165MP and 41.5 phr of Z1115MP. In the nonproductive mixing step for Samples A and B, all of the silica was initially added and mixed with the elastomer. In Sample C, all of the Z1165MP was initially dispersed followed by dispersing the Z1115MP.

Table II illustrates the properties of the cured rubber compositions.

TABLE I

| Sample | Control A | Control B | Control C |
|---|---|---|---|
| Non- Productive | | | |
| IBR[1] | 45 | 45 | 45 |
| E-SBR[2] | 34.38 | 34.38 | 34.38 |
| PBD[3] | 20 | 20 | 20 |
| Natural Rubber | 10 | 10 | 10 |
| Z1165MP[4] 175 m$^2$/g BET SSA 35 nm | 83 | 0 | 41.5 |
| Z1115MP[5] 125 m$^2$/g BET SSA 60 nm | 0 | 83 | 41.5 |
| Coupling Agent[6] | 13.28 | 13.28 | 13.28 |
| Processing Oil | 14 | 14 | 14 |
| Stearic Acid | 3 | 3 | 3 |
| Zinc Oxide | 2.5 | 2.5 | 2.5 |
| Antiozonant | 2 | 2 | 2 |
| Waxes | 1.5 | 1.5 | 1.5 |
| Productive | | | |
| Antioxidant | 1 | 1 | 1 |
| Sulfenamide-and Guanidine-Type Accelerators | 3.65 | 3.65 | 3.65 |
| Sulfur | 1.4 | 1.4 | 1.4 |

[1]Isoprene/butadiene copolymer rubber having an isoprene content of about 50 percent by weight obtained from The Goodyear Tire & Rubber Company and a Tg of about −45° C.

²Emulsion polymerized SBR having a styrene content of about 41 percent, 37.5 phr of oil and of the type obtainable as 1721 from the Huels A G Company.

³Cis 1,4-polybutadiene rubber obtained as Budene® 1207 from The Goodyear Tire & Rubber Company.

⁴High reinforcing grade silica sold by Rhodia under the designation Z1165MP.

⁵Low reinforcing grade silica sold by Rhodia under the designation Z1115MP.

⁶Obtained as bis-3-triethoxysilylpropyl)tetrasulfide (50% active) commercially available from Degussa under the designation X50S which is a 50/50 by weight blend of the tetrasulfide with N330 carbon black.

TABLE II

| Sample | A | B | C |
|---|---|---|---|
| Silica | | | |
| Z1165MP | 83 | 0 | 41.5 |
| Z1115MP | 0 | 83 | 41.5 |
| Rheometer (150° C.) | | | |
| T25 (min) | 8.6 | 5.6 | 7.7 |
| T50 (min) | 10.1 | 6.6 | 9 |
| T90 (min) | 13 | 10 | 11.3 |
| Max Torque (dNm) | 26.6 | 27.4 | 27.7 |
| Stress Strain | | | |
| Tensile Strength (MPa) | 17.1 | 15.3 | 17.3 |
| Elongation @ Break (%) | 491 | 361 | 484 |
| Specific Energy | 33.3 | 22 | 33 |
| Ratio Modulus | 4.8 | 4.9 | 4.9 |
| Shore A | 67.5 | 66.3 | 65.3 |
| 100% Mod (MPa) | 2.1 | 2.8 | 2.1 |
| 200% Mod (MPa) | 5.2 | 7.8 | 5.7 |
| 300% Mod (MPa) | 10 | 13.7 | 10.6 |
| Rebound | | | |
| 23° C. | 34 | 41.4 | 36 |
| 100° C. | 62 | 69.4 | 66 |
| Dynamic Mechanical Properties | | | |
| Tan Delta @ 50° C. | 0.175 | 0.147 | 0.159 |
| Tan Delta @ 0° C. | 0.299 | 0.279 | 0.294 |
| Tan Delta @ -20° C. | 0.614 | 0.562 | 0.614 |

The above data demonstrates that the present invention (Sample C) combines the advantage of the low reinforcing silica having a low tan delta at 50° C. which is beneficial for rolling resistance and a high tan delta at -20° C., like the high reinforcing silica, which is beneficial for wet grip. Sample C also provides excellent tensile strength values without giving up the desired Shore A hardness values. High tensile strength values predict beneficial handling properties while high hardness values predict improved traction. The above rebound values evidences the advance of Sample C. Sample C has high rebound values at 100° C. which is beneficial for rolling resistance and a low rebound value at 23° C. which is beneficial for wet grip properties.

What is claimed is:

1. A rubber composition comprising (A) an elastomer containing olefinic unsaturation and (B) 35 to 110 phr of silica filler, wherein said silica filler is comprised of (i) 10 to 100 phr of a first silica having a pore size distribution maximum of the aggregates in the first silica ranging from greater than 55 to 400 nm as determined by mercury porosimetry and an average specific surface area ranging from 60 to 135 m²/g as determined by N₂ adsorption; and (ii) 10 to 100 phr of a second silica having a pore size distribution maximum of the aggregates in the second silica ranging from 10 to 40 nm as determined by mercury porosimetry and an average specific surface area ranging from 140 to 250 m²/g as determined by N₂ adsorption.

2. The composition of claim 1, wherein said silica filler is comprised of (i) 41.5 phr of a first silica having a pore size distribution maximum of the aggregates in the first silica of 60 nm as determined by mercury porosimetry and an average specific surface area of 125 m²/g as determined by N₂ adsorption; and (ii) 41.5 phr of a second silica having a pore size distribution maximum of the aggregates in the second silica of 35 nm as determined by mercury porosimetry and an average specific surface area of 175 m²/g as determined by N₂ adsorption.

3. The composition of claim 1 wherein said composition is thermomechanically mixed at a rubber temperature in a range of from 140° C. to 190° C. for a total mixing time of from 1 to 20 minutes.

4. The rubber composition of claim 1 wherein the average specific surface area of the first silica differs from the average specific surface area of the second silica by at least 60 m²/g.

5. The rubber composition of claim 1 wherein said elastomer containing olefinic unsaturation is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

6. The rubber composition of claim 1 wherein the first silica has a pore size distribution maximum of the aggregates ranging from 60 to 120 nm and an average specific surface area ranging from 70 to 125 m²/g.

7. The rubber composition of claim 1 wherein said second silica has a pore size distribution maximum of the aggregates ranging from 10 to 40 nm and an average specific surface area ranging from 140 to 200 m²/g.

8. The rubber composition of claim 1 wherein the pore size distribution maximum of the aggregates in the first silica differs from the pore size distribution maximum of the aggregates of the second silica by at least 30 nm.

9. A method of processing a rubber composition which comprises mixing
   (i) 100 parts by weight of at least one sulfur vulcanizable elastomer containing olefinic unsaturation; and
   (ii) 35 to 110 phr of total silica filler, the improvement comprising (a) initially dispersing in said elastomer from 10 to 100 phr of a high reinforcing grade silica characterized by a pore size distribution maximum ranging from 10 to 40 nm as determined by mercury porosimetry and an average specific surface area ranging from 140 to 250 m²/g as determined by N₂ adsorption; and thereafter (b) dispersing in said elastomer from 10 to 100 phr of a low reinforcing grade silica characterized by a pore size distribution maximum ranging from greater than 55 to 400 nm as determined by mercury porosimetry and an average specific surface area ranging from 60 to 135 m²/g as determined by N₂ adsorption.

10. The method of claim 9 wherein the low reinforcing grade silica has a pore size distribution maximum of the aggregates ranging from 60 to 120 nm and an average specific surface area ranging from 70 to 125 m²/g.

11. The method of claim 9 wherein said high reinforcing grade silica has a pore size distribution maximum of the aggregates ranging from 10 to 40 nm and an average specific surface area ranging from 140 to 200 m²/g.

12. The method of claim 9 wherein the pore size distribution maximum of the aggregates in the low reinforcing grade silica differs from the pore size distribution maximum of the aggregates of the second silica by at least 30 nm.

13. The method of claim 9 wherein the average specific surface area of the low reinforcing grade silica differs from the average specific surface area of the high reinforcing grade silica by at least 60 m²/g.

14. The method of claim 9 wherein said elastomer containing olefinic unsaturation is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

15. A sulfur vulcanized rubber composition which is prepared by heating the composition of claim 1 to a temperature ranging from 100° C. to 200° C. in the presence of a sulfur vulcanizing agent.

16. The sulfur vulcanized rubber composition of claim 15 in the form of a tire, belt or hose.

17. A tire having a tread comprised of the composition of claim 15.

18. The method of claim 9 wherein said composition is thermomechanically mixed at a rubber temperature in a range of from 140° C. to 190° C. for a total mixing time of from 1 to 20 minutes.

19. The method of claim 9, wherein said silica filler is comprised of (i) 41.5 phr of a low reinforcing grade silica having a pore size distribution maximum of the aggregates in the first silica of 60 nm as determined by mercury porosimetry and an average specific surface area of 125 m²/g as determined by $N_2$ adsorption; and (ii) 41.5 phr of a high reinforcing grade silica having a pore size distribution maximum of the aggregates in the second silica of 35 nm as determined by mercury porosimetry and an average specific surface area of 175 m²/g as determined by $N_2$ adsorption.

* * * * *